Figures 1, 2:
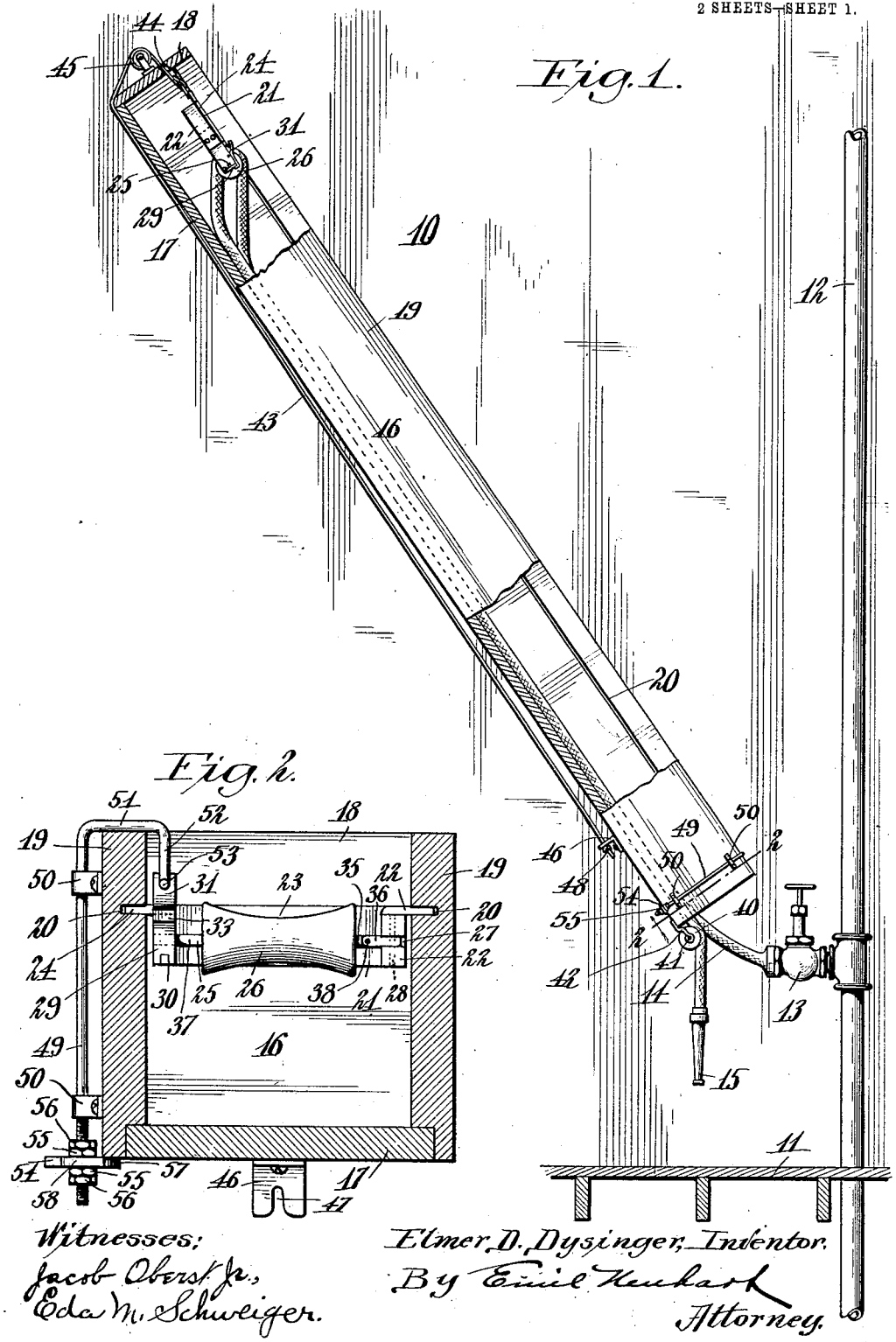

E. D. DYSINGER.
HOSE RACK.
APPLICATION FILED OCT. 15, 1912.

1,086,354.

Patented Feb. 10, 1914.

2 SHEETS—SHEET 1.

Witnesses:
Jacob Oberst Jr.
Eda M. Schweiger.

Elmer D. Dysinger, Inventor.
By Emil Kenkark
Attorney.

E. D. DYSINGER.
HOSE RACK.
APPLICATION FILED OCT. 15, 1912.
1,086,354.
Patented Feb. 10, 1914.
2 SHEETS—SHEET 2.
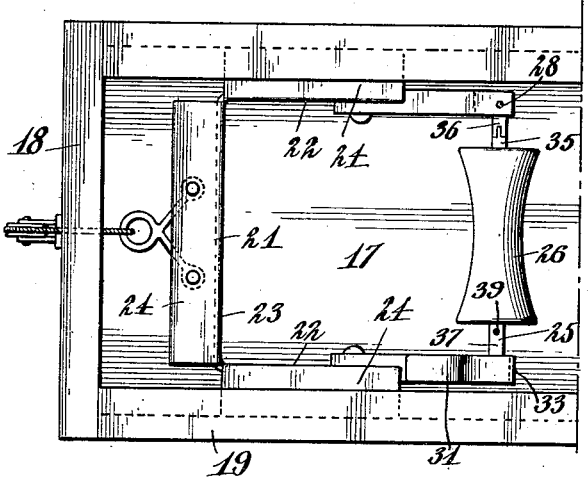
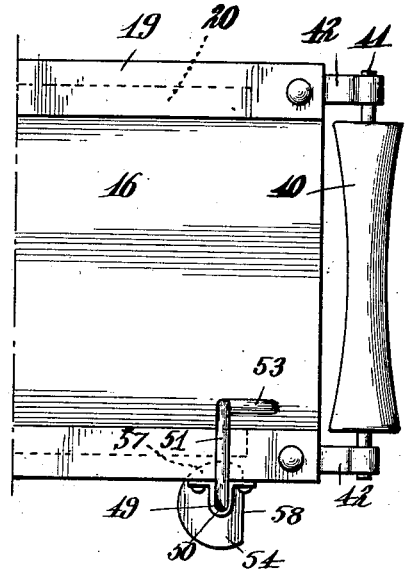
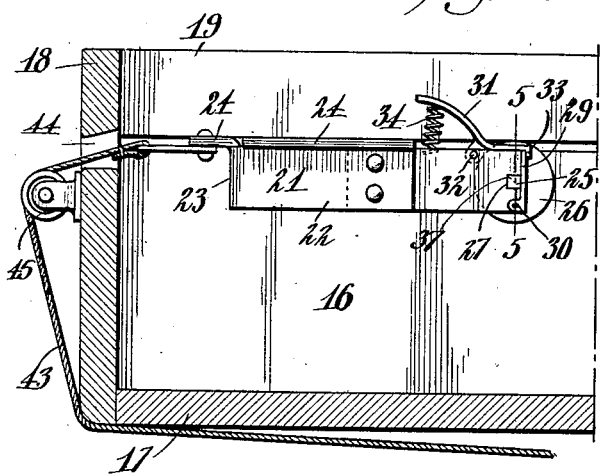
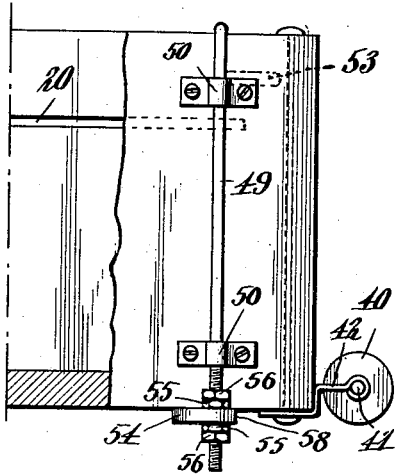
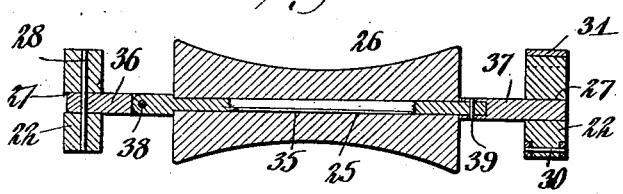
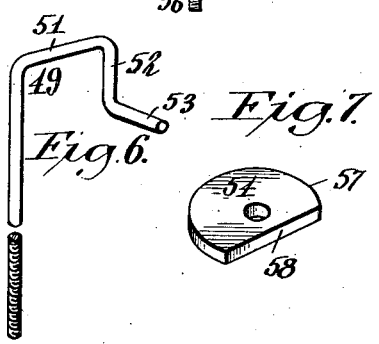
Witnesses:
Jacob Oberst Jr.
Eda M. Schweiger.
Elmer D. Dysinger, Inventor.
By Emil Kunkart
Attorney.
COLUMBIA PLANOGRAPH CO., WASHINGTON, D. C.

UNITED STATES PATENT OFFICE.

ELMER D. DYSINGER, OF BUFFALO, NEW YORK.

HOSE-RACK.

1,086,354. Specification of Letters Patent. Patented Feb. 10, 1914.

Application filed October 15, 1912. Serial No. 725,791.

*To all whom it may concern:*

Be it known that I, ELMER D. DYSINGER, a citizen of the United States, residing at Buffalo, in the county of Erie and State of New York, have invented certain new and useful Improvements in Hose-Racks, of which the following is a specification.

My invention relates to improvements in hose racks of that type usually employed in large buildings equipped with fire protection systems.

In hose racks now in use the hose is supported in such a manner that numerous water pockets are created in which the water is retained and causes weakening of the hose due to rotating of the material and when it is taken from the rack and water is forced into it under pressure it will burst and become useless.

Another disadvantage of the hose racks now in use is that by reason of the number of times it is coiled or stretched back and forth on the rack it cannot be conveniently and expeditiously handled in a manner such as an emergency of fire requires and, furthermore, there is a tendency of the hose to become entangled or twisted during the operation of drawing the same into a single length.

It is the object of my invention to overcome these disadvantages and with this and other objects in view the invention consists in a hose rack of simple construction, easily operable, and from which the hose may be quickly removed and drawn out into a single stretch for use without liability of becoming entangled.

In the drawings,—Figure 1 is a sectional elevation of my improved hose rack arranged in close juxtaposition to a water supply pipe. Fig. 2 is an enlarged transverse section taken on line 2—2, Fig. 1, looking in the direction of the arrow crossing said line. Fig. 3 is a broken top plan view. Fig. 4 is a sectional elevation, a portion of the side and end wall of the rack being broken away to better illustrate the traveling carriage located therein. Fig. 5 is an enlarged transverse section taken on line 5—5, Fig. 4. Fig. 6 is a detached broken perspective view of the trip-rod whereby the hose is caused to be released from the rack. Fig. 7 is a detached perspective view of the keeper plate controlling the movement of said trip-rod.

Referring now to the drawings in detail, like numerals of reference refer to like parts in the several figures.

The reference numeral 10 designates a wall of a building, 11 the floor thereof, 12 a water supply pipe having a valve fitting 13 secured thereto for connection therewith of a hose 14 which is adapted to be supported by my improved rack. The valve fitting under usual conditions serves to shut off the supply of water from the hose and when open supplies the water to the hose, which latter is equipped with a nozzle 15 at its opposite end.

My improved rack comprises a supporting member in the form of an elongated box or trough 16 which is preferably arranged in an inclined position for the purpose of draining the water from the hose, as will appear hereinafter. While this inclined position is most desirable it is apparent that the box or trough may be arranged vertically, or where the height of the ceiling from the floor will not permit, the inclination may be slight or the trough may even be arranged horizontally, but it will be clear from the description following that best results are obtained with considerable inclination to the trough or by arranging the same vertically where the height of the ceiling or roof will permit, but owing to the fact that the hose is to be arranged in only two stretches when supported, there may be few places where the trough can be used in a vertical position, as the length of the trough is substantially one half of the length of the entire hose supported, and by reason of such an arrangement when the hose is supported, all water pockets are eliminated and the possibility of the hose rotting by reason of retaining water is entirely obviated.

The box-like structure or trough comprises a bottom 17, an end wall 18, and two side walls 19. Each of the side walls is provided on its inner face with longitudinal grooves 20 extending from one end of the trough to a point near the other and guided for movement lengthwise in the trough is a carriage 21 which in preferred form comprises two side members 22 and an end member 23 forming a substantially U-shaped frame, preferably constructed of metal. Each of the side members 22 has an outstanding flange 24 of a size to fit into the grooves 20 in such a manner that the carriage slides freely within the trough. A portion of the side members and the end member of said carriage are formed in one integral piece and may be rolled and bent into the form shown, the remaining portion of said side members being riveted or otherwise secured to the portions formed in piece with the end member. By thus constructing the carriage the free ends or extremities of the side members may be formed of hardened steel, which is preferable in view of the fact that in said ends are secured the extremities of a transverse shaft 25 on which is rotatably mounted a hose supporting roller 26. This roller I preferably give a concave contour and when the hose is placed over the same it tends to keep the hose in central position on said roller. The extremities of the side members of the carriage are notched, as at 27, to receive the ends of said shaft, one end thereof being pivotally secured in its receiving notch 27 by means of a pin 28 passing through the side member in which said notch is formed, and the other end being removably held in its coöperating notch 27 by a latch 29 which is pivoted to the carriage at 30 and is adapted to swing downwardly to release said shaft. The latch 29 is held against the carriage by a keeper 31 pivotally secured between its ends, as at 32, and having its outer end provided with a hook 33 adapted to engage the free end of the latch 29. An expansion spring 34 acts against the inner end of said keeper to retain it in engagement with said latch and thus hold the shaft 25 within the carriage.

The shaft 25 is formed in three sections 35, 36, 37, the section 35 being the intermediate section on which the hose supporting roller 26 is rotatably held, and the sections 36, 37 being end sections. The end section 36 is pivotally secured to the intermediate section by a pivot pin 38 arranged at right angles to the pivot pin 28 which serves to secure one end of said shaft to the carriage so that the shaft may break at one end of said hose supporting roller. A portion of said intermediate section is reduced in diameter to form a shoulder against which one end of said roller bears and the opposite end of said intermediate section enters a socket formed in the adjacent end of the other end section 37, a pin 39 being passed through said sections to securely fasten the same together. The inner end of said opposite end section forms a shoulder against which the adjacent end of the hose supporting roller bears. Thus the supporting roller is confined between two shoulders and is rotatable on the reduced portion of the intermediate section.

At the lower or open end of the trough a transversely disposed roller 40 is provided, this roller being mounted on a shaft 41 held in brackets 42 extending from the bottom of the trough.

Secured to the end wall of the carriage 21 in any suitable manner is a retainer cable 43 which passes through an opening 44 in the end wall 18, thence over a cable sheave 45 secured to said end wall and downward underneath the bottom of the trough to a bifurcated retainer 46, through the bifurcation or notch 47 of which said cable is passed, the latter having a knot or other enlargement 48 adapted to bear against the retainer and hold the carriage elevated.

At the lower end of the trough is a trip-rod 49 which is movable lengthwise in guides 50 secured to one of the side walls of said trough, and at its upper end it has an inwardly-directed portion 51 and a downwardly-directed portion 52 which terminates in a trip extension 53 arranged substantially parallel with the line of travel of the carriage 21. At its lower end said trip-rod has a segmental keeper-plate 54 which is secured to said rod by means of nuts 55 threaded onto the rod and bearing against opposite sides of the keeper-plate, and jam nuts 56 bearing against the nuts 55 to prevent movement of the keeper-plate lengthwise on said rod. At certain times in the operation of the apparatus said trip-rod is held against movement by the keeper-plate 54 which is turned between the nuts arranged at opposite sides thereof to bring the extending portion 57 thereof underneath the bottom of the trough, but when said keeper-plate is turned to face the cutaway or straight edge 58 thereof toward the side of the trough, the trip-rod may be elevated, as sufficient of the plate is cut away to provide the necessary clearance to permit the keeper-plate to be raised above the lower longitudinal edge of said trough.

The hose is supported within the trough in the manner shown in Fig. 1, it being simply doubled around the hose supporting roller 26 carried by said carriage 21, which latter is elevated so that the hose lies within the trough in two stretches, the nozzle end depending from the open end of the trough and the opposite end being secured to the valve fitting of the supply pipe. The carriage is held in elevated position by the retainer cable 43 and in case of fire it is simply necessary to disengage said cable from the retainer 46 whereupon the carriage will slide downward within the trough, and while sliding the nozzle end of the hose is taken hold of and the hose drawn from the trough until the carriage strikes the lower ends of the grooves 20 in the side walls 19 of said trough. This limits the downward movement of the carriage and as the latter approaches the end of its downward movement the trip-rod 49 is engaged by the pivoted keeper 31 and as said trip-rod is held against upward movement said pivoted keeper is depressed so that its hook end becomes disengaged from the pivoted latch 29, whereupon the weight of the hose still wound around the supporting roller 26 causes the shaft 25 to be swung on its pivot pin 28, the supporting roller therefore swings into a position at an angle to that which it normally assumes and said shaft with its roller also swings on the pivot pin 38 so that it automatically frees itself from the hose, which can then be drawn to the location of the fire without any tendency of its becoming coiled or twisted.

In placing the hose in position within the trough the keeper-plate 54 is rotated on the trip-rod 49 to bring the straight edge 58 thereof to face the trough, thus permitting the rod to be elevated. The hose may now be placed over the supporting roller 26 and the shaft 25 with its roller swung into proper position in the carriage, after which the pivoted latch 29 may be swung against the end of said carriage and the pivoted keeper 31 engaged with said latch. The carriage is then drawn upwardly by pulling upon the retainer cable 43, the hose following the same and being supported when in elevated position in two stretches with the nozzle end depending from the trough and the coupling end attached to the valve fitting of the supply pipe. By uncoupling the coupling of the hose from the valve fitting and opening the nozzle the water will drain from every portion of the hose after which the hose may again be coupled to the valve and be in position for use when required.

Having thus described my invention, what I claim is,—

1. A hose rack comprising a trough-like structure, a carriage guided for movement lengthwise in said trough-like structure, a hose supporting roller arranged transversely in said carriage and adapted for swinging movement thereon, said hose supporting roller being adapted to support a hose passed around the same, means for retaining said carriage at one end of said trough-like structure, and means at the other end of said trough-like structure for causing said hose supporting roller to swing on said carriage and automatically disengage the hose therefrom when the carriage approaches said other end.

2. A hose rack comprising an elongated guiding member, a carriage guided for movement lengthwise on said guiding member, a transverse shaft arranged in said carriage and having one end thereof pivotally secured therein and its other end removably secured, said shaft having two pivotally connected parts, one of which swings on the other at an angle to the direction in which the entire shaft swings, means for retaining the removably held end of said shaft in said carriage, a hose roller rotatable on said shaft around which a hose may be passed, and means on said guiding member for automatically freeing the removably held end of said shaft to permit the latter to swing on the pivot at its other end and thus to permit the shaft to break between its ends.

3. A hose rack comprising an elongated guiding member, a carriage adapted for movement lengthwise on said guiding member and means for retaining it at the end of its movement in one direction, a shaft arranged transversely in said carriage and having one end pivotally secured in said carriage to swing in the line of travel of said carriage and its other end removably held, said shaft comprising two pivotally connected parts having the connecting pivot at an angle to the pivot at one end of said shaft, a hose roller rotatable on said shaft and adapted to have a hose wound around the same, a hose roller at the opposite end of said guiding member, and a trip device between said last mentioned hose roller and said carriage having a trip-portion in the path of said carriage adapted to release the removably held end of said shaft from said carriage.

4. A hose rack comprising an elongated trough, a carriage guided for movement lengthwise in said trough, a transverse shaft held in said carriage and pivotally secured at one end to permit of its swinging on said carriage, retaining means to removably retain the opposite end of said shaft in said carriage, a hose supporting roller rotatable on said shaft and adapted to have a hose passed around the same and arranged lengthwise in said trough, means to retain said carriage at one end of said trough, and means at the opposite end of said trough to engage said retaining means on said carriage and disengage the removable end of said shaft to permit the same with said hose roller to swing on said carriage and cause the removal of said hose from said roller when the carriage approaches said opposite end.

5. A hose rack comprising a trough-like structure adapted to extend in an upward direction from a supply pipe, said trough-like structure having guide grooves in its side walls, a carriage of U-shaped formation having oppositely-directed guide flanges entering said grooves, a retainer cable secured to said carriage and extending therefrom to a point underneath the bottom of said trough, a retainer secured to the bottom of said trough and adapted to be engaged by said retainer cable, and a roller arranged transversely in said carriage and adapted to have a hose passed around the same and extend lengthwise therefrom in longitudinally-disposed stretches.

6. A hose rack comprising an elongated trough having side walls, a bottom wall and an end wall and having said end wall provided with an opening, a carriage movable lengthwise within said trough and guided on said side walls, said carriage having a transversely-disposed shaft pivotally secured at one end to said carriage and removably retained in said carriage at its other end, a hose roller on said shaft, a retaining cable secured to said carriage and passing through the opening in the end wall of said trough and thence down around said end wall and underneath the bottom wall of said trough, means for securing the end of said retaining cable, and a trip-rod at the opposite end of said trough adapted to cause the removably retained end of said shaft to become disengaged from said carriage so as to permit said shaft to swing on its pivot and cause the automatic disengagement of said hose from said reel when the carriage approaches said opposite end.

7. A hose rack comprising an elongated trough, a carriage slidable lengthwise in said trough and comprising opposite side members and an end member connecting said side members at one end, the opposite end of each of said side members being free and having notches formed therein, a transverse shaft having its ends entered in said notches, one end of said shaft being pivotally secured in its receiving notch and the opposite end being removably retained, a pivoted latch bearing against the carriage to retain said last-mentioned end of the shaft in its notch, a pivoted spring-controlled keeper engaging said latch to retain the same against said carriage, means for holding said carriage at one end of said trough, and a trip-rod at the opposite end of said trough guided for lengthwise movement and having a trip-portion parallel with the line of travel on said carriage, said trip-portion being adapted to cause actuation of said pivoted keeper when engaged thereby and permit the swinging of said shaft.

In testimony whereof, I have affixed my signature in the presence of two subscribing witnesses.

ELMER D. DYSINGER.

Witnesses:
 EMIL NEUHART,
 JACOB OBERST, Jr.

Copies of this patent may be obtained for five cents each, by addressing the "Commissioner of Patents, Washington, D. C."